United States Patent [19]

Redemacher

[11] Patent Number: 4,879,607
[45] Date of Patent: Nov. 7, 1989

[54] MAGNETIC CARD READER DEVICE
[75] Inventor: Darrell G. Redemacher, Freeville, N.Y.
[73] Assignee: XCP, Inc., Dryden, N.Y.
[21] Appl. No.: 216,030
[22] Filed: Jul. 8, 1988
[51] Int. Cl.$^4$ .............................................. G11B 25/04
[52] U.S. Cl. ........................................ 360/2; 235/449
[58] Field of Search ............................ 360/2; 235/449
[56] References Cited
U.S. PATENT DOCUMENTS
4,231,072 10/1980 Toyama ................................. 360/2

Primary Examiner—Harold I. Pitts
Attorney, Agent, or Firm—Wall and Roehrig

[57] ABSTRACT

A magnetic card reader for magnetic-stripe cards, has a drive drum that rotates in a forward direction to draw the card into the device and read data from the stripe, and rotates in a reverse direction to eject or expel the card and to write new data on the stripe. The drive drum has first and second removable resilient tires carried on it at positions axially spaced on the drum. A magnetic recording/pickup head is positioned below the drive drum at the position of the first tire. A floating adjustable vertical head support assembly mounts the head to the frame and permits up and down movement of the head, but not back and forth or sideways travel. This floating head support assembly can favorably comprise a leaf spring. An idler pulley is positioned below the drive drum at the position of the second tire to urge the magnetic card against it. The idler pulley is mounted on a spring-loaded idler arm so that the pulley can follow variations in thickness of the cards. A set screw on the idler arm holds the pulley out of contact with the second tire when there is no card in the card reader device, so that the tire does not develop a flat spot from sustained contact with the idler pulley.

14 Claims, 2 Drawing Sheets

MAGNETIC CARD READER DEVICE

BACKGROUND OF THE INVENTION

This invention relates to mechanisms for reading data recorded on magnetic media and for recording data on the media. The invention is more particularly directed to magnetic card reader devices in which a card that has a magnetic stripe is transported past a magnetic pick-up and recording head.

Conventional magnetic card motorized transport systems employ fixed drive mechanisms. These mechanisms typically employ a single drive wheel or capstan and a single opposing idler wheel or roller. With such mechanisms, if a very thin magnetic card is inserted, the card would slip and the head would read out erroneous data. On the other hand, if the card were too thick, there would be a tendency for the card to stick or jam. Unfortunately, magnetic stripe cards tend to vary rather widely in thickness, and a photo-ID laminated magnetic card can vary in thickness from about 0.025 to 0.040 inches. Consequently, these conventional card reader devices have often encountered problems in use.

Another problem with card readers comes about because of the tendency of cards to vary in thickness, or to become warped or curled. If the card has an uneven surface, the magnetic head can come out of contact with the magnetic stripe, causing misreading during pickup or causing writing of errors on recording.

A third problem with the card transport mechanisms of conventional readers is that drive and idler wheels can develop a set or flat spot from remaining depressed against each other during times of non-use. Consequently, there is a tendency for the drive and idler wheels to become somewhat out-of-round at the circumferential surface. This can lead to jamming, or can produce errors in either the pickup or write cycles during transport of the card.

Still another problem of conventional card readers is the problem of "skew", i.e., a tendency of the card to turn in the reader transport mechanism, so that the head and magnetic stripe traverse one another obliquely. If there is a single drive roller, skewing is unavoidable. The data recorded on the card's magnetic stripe occurs as magnetic transitions that are perpendicular to the longitudinal direction of the stripe. If the card becomes skewed, these transitions begin to cross the gaps on the magnetic head out of proper synchronism, and errors are generated. For example, skewing of a magnetic striped card can change a credit value e.g. from $1.00 to $10.00, or to a different code. Severe skewing can totally garble the data and can make encrypted data unreadable by the mechanism.

A previously proposed magnetic card reader which has fixed drive and idler rollers, and a rigidly mounted head is described in U.S. Pat. No. 4,599,510. Another card reader with a stepped-diameter drive roller arrangement to compensate for skew is described in U.S. Pat. No. 3,899,659. Aspects of other magnetic reading/writing devices are described, e.g., in U.S. Pat. Nos. 4,377,828; 4,585,929; 3,890,644; 3,737,884; 3,940,796; and 4,628,386.

OBJECTS AND SUMMARY OF THE INVENTION

Accordingly, it is an object of this invention to provide a magnetic card reader device which avoids the above-mentioned drawbacks of the prior art.

It is another object of this invention to provide a magnetic card reader device which accommodates magnetic cards of a range of thicknesses without sticking or slipping and without producing errors in picked-up or recorded data.

It is a further object of this invention to provide a magnetic card reader device that avoids skewing of the magnetic card as it is transported through the device.

According to an aspect of this invention, a magnetic card reader device is situated on a frame within a housing to receive a magnetic-stripe card. The card can have recorded on its stripe encoded data, such as a credit or debit value. A drive drum is mounted on the frame. The drum rotates in a forward direction to draw the card into the device to read the data, and rotates in a reverse direction to eject or expel the card and to write new data on the stripe. The drive drum has fist and second resilient tires carried on it at positions spaced axially on the drum. A magnetic recording/pickup head is positioned below the drive drum, i.e., opposite the plane of card travel from the drive drum, at the position of the first tire. A floating head support assembly mounts the head to the frame, and permits up and down movement of the head, as well as limited roll about the longitudinal axis, but without back and forth or sideways travel, so that the head will accommodate variations in the thickness of the card. The floating head support assembly, which can favorably comprise a leaf spring or a parallel pair of leaf springs, lets the head deflect a few degrees when a magnetic card is drawn distally, into the reader, but not deflect up further than 0.005–0.010 inch toward the drive drum tire located above the magnetic head. A fixed stop prevents upward deflection towards the drive drum tire.

An idler pulley is positioned below the drive drum at the position of the second tire to urge the magnetic card against it. The idler pulley is mounted on a spring-loaded idler arm to permit the idler pulley to deflect away from the drive drum so as to follow variations in the thickness of the card. A set screw or equivalent stop element holds the pulley out of contact with the second tire when there is no card in the card reader device, so that neither the tire nor the idler pulley develops flat spots.

The drive drum is powered by a motor mechanism, and the head is connected to electronic circuitry to receive and interpret the recorded data when the card is drawn in, and to supply new data for the head to write on the card when the card is being moved out of the device.

In a preferred embodiment the first tire (i.e., the one that opposes the head) is of a softer elastomeric material and the second tire (i.e., the one that faces the idler pulley) is of a firmer elastomeric material. Both are replaceable elements, and slip onto annular grooves on the drive drum.

In this device, as a thick or thin card enters the transport mechanism, the idler pulley adjusts automatically to the thickness of the card. If the card has bumps or hollows, the idler arm compensates by raising or lowering the idler pulley to follow the contour of the card surface.

The problem of reading and writing errors is solved by the floating head support assembly. The leaf spring assembly has an opening in one end that fits on a support post, and an elongated opening in the other end which will accommodate a small amount of transverse movement relative to another associated support post. There is a set screw in the central receptacle portion of the leaf spring assembly, that permits the position of the leaf spring assembly, and the head it supports, to be adjusted relative to the first tire of the drive drum. Optimally, there is about an 0.005 inch clearance between the head and the associated drive tire.

The pair of 0.005 thick leaf springs are separated by a distance of 0.010 inches. One of the leaf springs has its flanged opening for the recording head pointed upward, whereas the other mating leaf spring has its flanged opening for the recording head pointed downward. Both leaf springs have an elongated opening at one end, and a round hole at the other end that fits on a support post. The elongated openings are fitted also over on the opposite support post which will accommodate a small amount of transverse movement relative to the other support post when the recording head is forced downward away from the drive tire. The pair of leaf springs cancel out vibration and jitter as the magnetic stripe of the card is moved across the recording head. Both of the flanges of the leaf springs are molded into a plastic receptacle maintaining the separation of 0.010 between the two leaf springs. At each end of the leaf springs, a 0.010 spacer washer is inserted between the two leaf springs to maintain separation at each end of the leaf spring. The leaf spring-recording head assembly is placed over a coil spring and washer on each of the 0.5 inch posts. A locking nut is turned down on each post to position the leaf spring-recording head assembly within 0.005 inches from the drive tire and against the two stops on each side of the recording head receptacle. There is a set screw in the central receptacle portion of the leaf spring, that permits the position of the recording head to be adjusted in a drum. Optimally, there is about an 0.005 inch clearance between the head and the associated drive tire. The floating leaf spring mount permits the head to float up or down with the proximal-distal direction, and without jitter or vibration.

When a magnetic stripe card is inserted into the card reader device, the card reaches the upper drive drum and the lower idler pulley just after the card leading edge strikes the record-playback head. As the card is pushed against the head, the elongated opening in the leaf springs permit the head to deflect, slanting about 5 to 7 degrees. This absorbs the impact of the card striking the head. Then the leaf spring assembly springs back to its original position holding the head vertically against the magnetic stripe portion of the card as the latter is drawn past it. However, the card deflects the head downwards, so the head follows the card contour, without leaving the surface or cutting into the surface of the magnetic stripe.

During the write cycle, which occurs as the card is being ejected or expelled from the device, it is critically important that the magnetic head remain stable as the card's magnetic stripe passes along it. To ensure stability and to avoid jitter, the leaf springs are made of a suitable spring metal of sufficient width and hardness to hold the head stable and to prevent vibration or jitter.

Skew of the card is prevented by use of the twin-tire drive drum. The drive drum is mounted on a drive shaft that turns the drum to transport the card in or out of the device. The drive tire over the magnetic head is of a relatively spongy material while the drive tire over the idler roller is of a relatively firm material. The objective is to divide the drive force substantially equally between the two drive tires of the drive drum. Thus, when the drum rotates, the card is transported without skew.

The above and many other objects, features and advantages of this invention will become apparent from the ensuing description of a preferred embodiment, when read in connection with the accompanying Drawing.

DETAILED DESCRIPTION OF A PREFERRED EMBODIMENT

Figure 1:
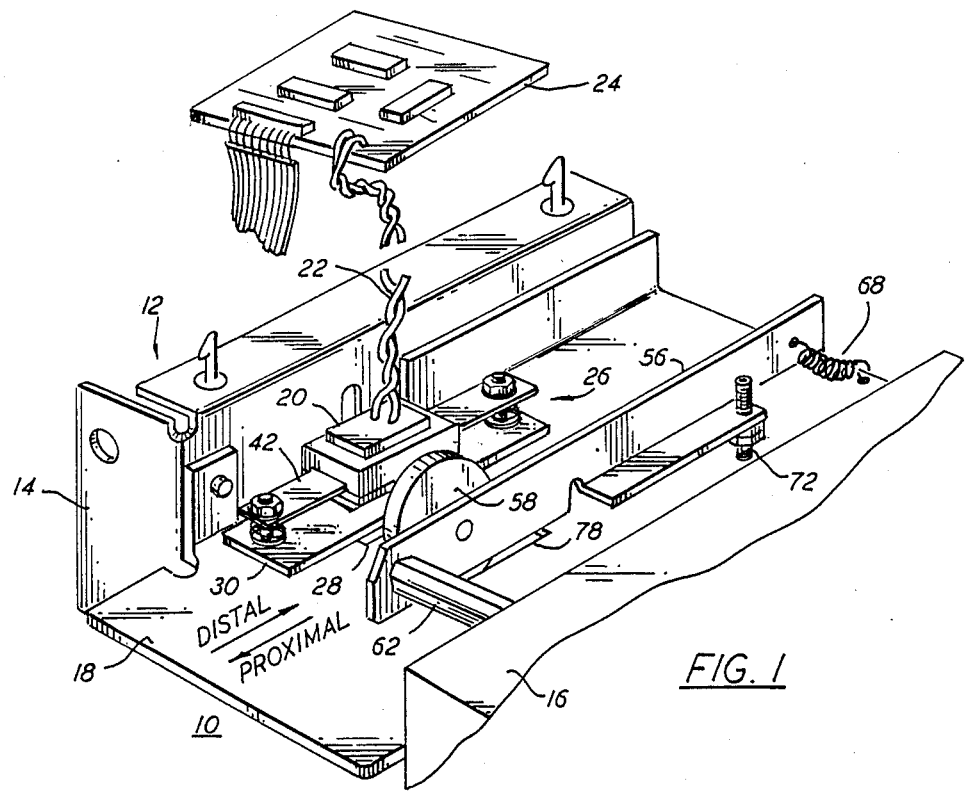
FIG. 1 is an inverted bottom perspective view of a card reader device according to an embodiment of this invention.

With reference to the Drawing, and initially to FIG. 1, a card reader device transport mechanism 10 is shown to have a frame 12 comprised of parallel vertical side plates 14 and 16, with a base plate or bed 18 extending horizontally between them. The base plate 18 defines the plane across which the magnetic card (not shown) is drawn.

A recording/playback head 20 has twisted leads that connect with control and decoding circuitry, shown schematically as a printed circuit board 24. This circuitry interprets signals from the head and supplies signals to the head 20 for a data writing operation.

Figure 2:
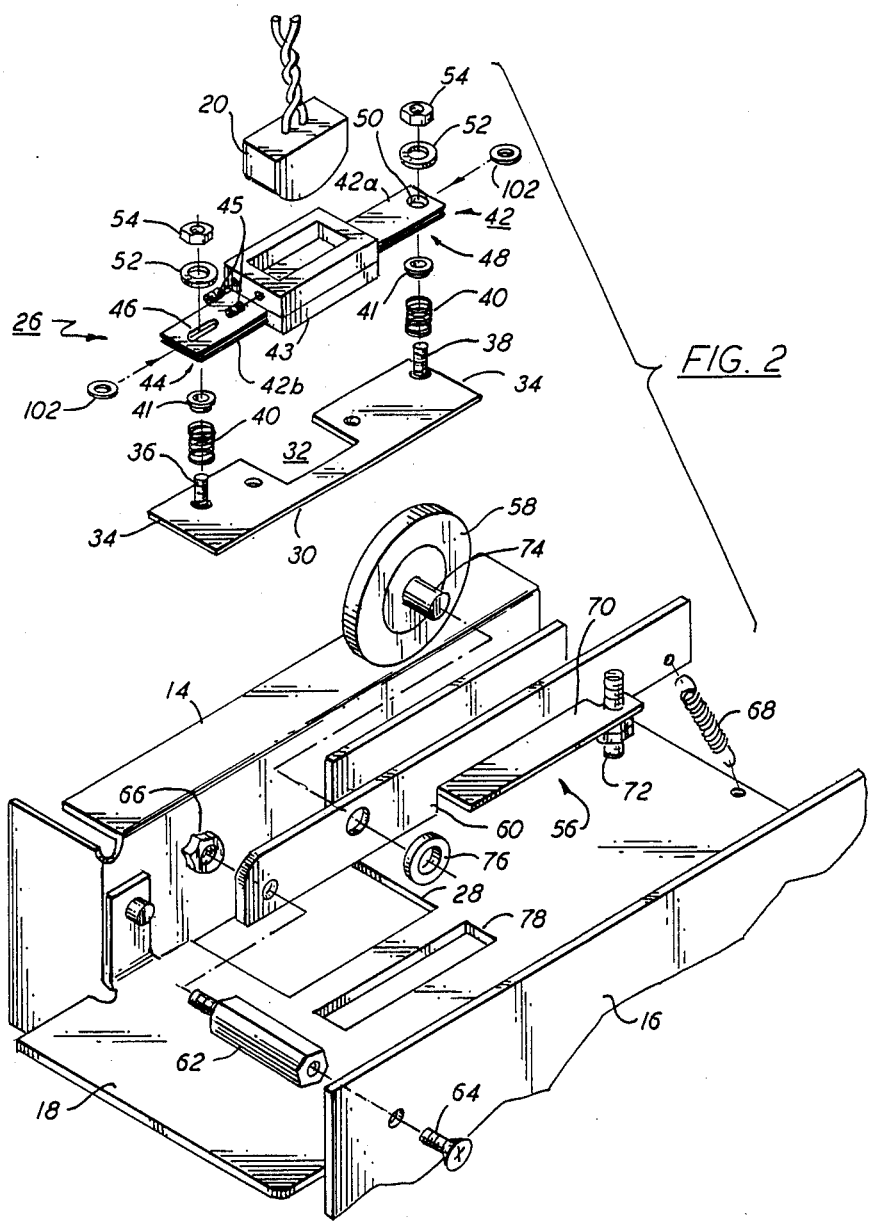
FIG. 2 is an exploded bottom perspective view of the above embodiment.

A floating support assembly 26 mounts the head 20 to the frame 12, and this is shown in more detail in FIG. 2.

At a head opening 28 at one side edge of the base plate 18, there is a head-mounting base 30 attached. The latter is generally a rigid aluminum frame having a central cutout 32 and full-width ends 34. A pair of vertical studs 36 and 38 are affixed vertically to the ends 34 of the head-mounting base 30, at proximal and distal sides thereof, respectively. A pair of coil springs 40 serve as spacers and repose over the studs 36,38. Shoulder washers 41 keep the springs 40 centered on their respective studs. Atop these lies a flat leaf spring assembly 42, made of a pair of parallel leaf springs 42a, 42b.

The spring assembly 42 is oriented proximally-distally, and has a central receptacle block 43 with a rectangular aperture within which the magnetic head 20 is secured, e.g., with set screws 45 situated in threaded openings in one end of the block 43. The head is adjusted to a desired level in the block 43 and fixed at that level by use of the set screw 45. A proximal end 44 of the spring assembly 42 has a slot or elongated opening fitting over the stud 36, while a distal end 48 of the spring 42 has a circular opening 50 which generally matches the size of the stud 38 over which it is situated. The spring assembly 42 is held to the studs 36 and 38 by means of appropriate washers 52 and locking nuts 54.

Returning now to FIG. 1, an idler assembly 56 is shown to be mounted in the frame 12 alongside the head 20 and at the underside of the base plate 18. As shown in more detail in FIG. 2, the idler assembly comprises an idler wheel or pulley 58 that is rotatably mounted on an idler pivot arm 60. A pivot post 62 pivotally mounts the end of the arm 60 to one of the side plates 16. A retaining screw 64 holds the pivot post in place in the side plate 16, while a retaining nut 66 holds the end of the pivot arm 60 to the post 62 permitting limited swinging motion. The free end of the arm 60 lies at the far or distal end of the frame 12 and a tension spring 68 resiliently biases the arm 60 towards the base plate 18.

A flange 70 on the pivot arm 60 holds a set screw 72, which establishes a desired standoff for the idler wheel 58, as the set screw 72 rests against the base plate 18. The idler wheel 58 has an axle 74 which passes through an opening in the arm 60 and is held by a suitable retainer 76. Here the set screw 72 is mounted on the flange 70, but in other embodiments the set screw could be mounted on the base plate 18 to contact the flange 70 of the pivot arm 60.

Finally, an opening 78 is provided in the bed or base plate 18 through which the idler wheel 58 can pass.

Figure 3:
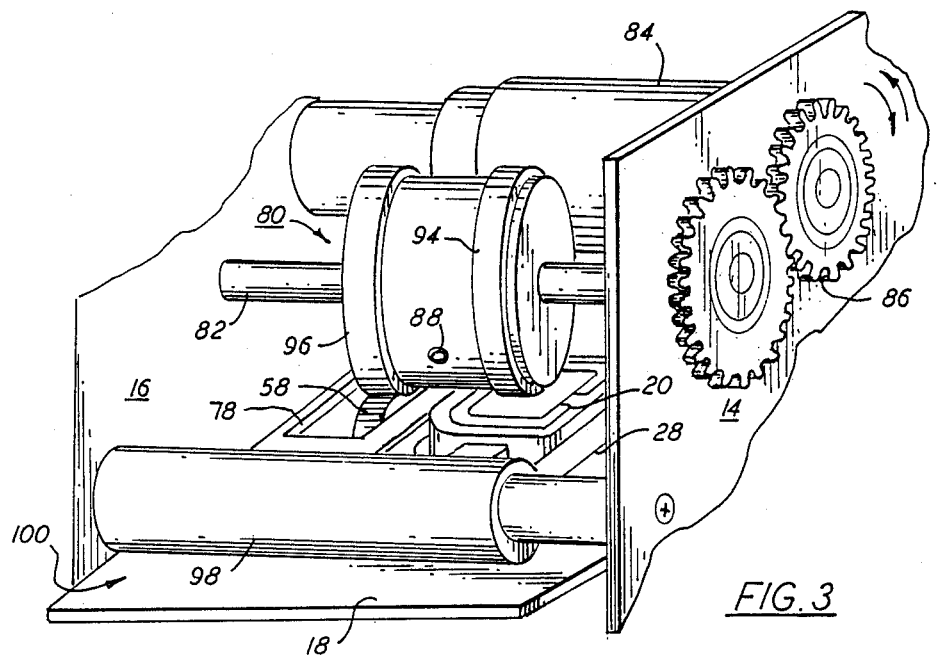
FIG. 3 is a partial top perspective view of the card reader device of this embodiment.
Figure 4:
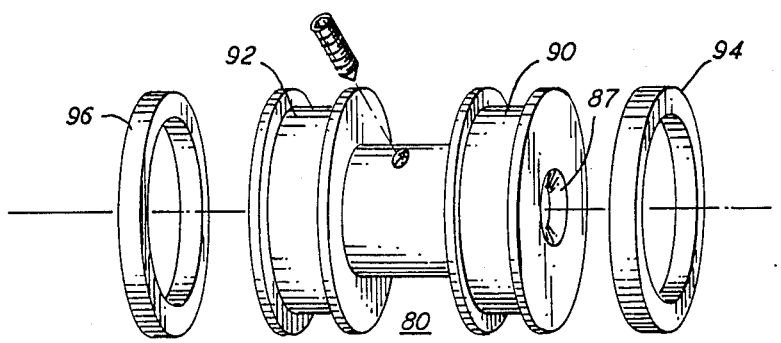
FIG. 4 is a partial exploded view of a drive drum with replaceable drive tires, of the above embodiment.

Turning now to FIG. 3, a generally cylindrical drive dru 80 is shown to be mounted on an axle 82 at the upper side of the base plate 18 and corresponding to the positions of the magnetic head 20 and the idler wheel 58. The axle 82 is rotated by an electric motor 84 which is connected to it by a suitable drive transmission 86, which can be, for example, a belt or gear drive As shown in FIG. 4, the drive drum 80 has an axial opening which fits over the drive axle 82 and a set screw 88 holds the drum 80 to the axle 82. First and second circumferential annular channels or grooves 90 and 92 receive respective replaceable drive tires 94 and 96, formed as rings of rubber or of another similar suitable resilient material. The tire 94 is of a low durometer, and is relatively softer than the tire 96. The first and second tires 94 and 96 face against the magnetic head 20 and the idler wheel 58, respectively.

As also shown on FIG. 3, a spacer bar 98 or spacer roller is placed across the proximal end of the frame 12 slightly above the base plate 18, to define a card slot 100 through which the card enters and exits the device.

The position of the tires 94 and 96 on the drum 80 and the positions of the head 20 and idler wheel 58 on the base plate 18 can be varied depending, for example, on whether the card has a magnetic stripe at its center or at one edge.

With the card reader constructed according to the principles described hereinabove, a magnetic stripe type card is drawn in securely without skew, and the head 20 and idler wheel 58 will maintain even contact on the card, notwithstanding variations in thickness from one card to another, or waviness or warping of the card. The floating support 26 for the head 20 ensures that the magnetic signals picked up by the head and those recorded by the head onto the stripe are produced uniformly, and without tracking errors. The coil springs 40 provide a flat support to prevent vertical deflection of the head into the drive tire, but permit sufficient lateral roll of the leaf springs and head to follow the magnetic stripe if the card is warped.

The recording head leaf springs 42a, 42b, are each 0.005 inch spring steel or beryllium copper with a spacer washer 102 between the leaf springs 42a, 42b at each end. The studs 36,38 are 0.5 inches in height, and the springs 40 are 0.25 inch coil springs, 3-ounce stiffness. The leaf spring assembly 42 permits a downward deflection of 0.010 to 0.050 inches, depending on the thickness of the cards, and also tips on a horizontal axis up to 7 degrees, as the springs 40 are compressed by the rocking of the leaf spring assembly 42. As a card is inserted, only the one end of the leaf spring assembly moves, to deflect up to 0.050 as the head is pushed by the card, which is itself of a thickness of 0.010 to 0.050 inches.

Incidentally, terms of orientation such as "vertical" or "above" are intended with reference to the illustrated embodiment and are given for simplicity of explanation only. There is no intention to limit the invention only to card readers of a particular orientation.

While the invention has been described in detail with respect to a single preferred embodiment, it should be understood that the invention is not limited to that embodiment. Rather, many modifications and variations would present themselves to those of skill in the art without departing from the scope and spirit of this invention, as defined in the appended claims.

What is claimed is:

1. A magnetic card reader device for reading magnetically recorded data from a magnetic stripe on a card and recording data on said stripe; comprising a frame;

a drive drum mounted on said frame and rotatable in a forward direction to draw said card in a distal direction and rotatable in a reverse direction to expel said card in a proximal direction, said drive drum having first and second resilient tires carried thereon at positions axially spaced on said drum;

an adjustable vertically magnetic recording/pickup head positioned opposite a card travel plane from said drive drum at the position of said first tire;

floating head support means mounting said head to said frame for permitting movement of said head towards and away from said drive drum to accommodate variations in thickness of said card, and including means permitting deflection of said head when said card is drawn in, but not when said card is expelled;

an idler pulley positioned opposite the card travel plane from said drive drum and positioned to urge said card against said second tire;

an idler arm pivotally mounted on said frame and resiliently urging said idler towards said second tire but yielding to permit said idler pulley to deflect away from the drive drum to accommodate variations in the thickness of said card; including stop means holding said idler pulley out of contact with said second tire when no card is between the idler pulley and the drive drum;

drive means for rotating said drive drum in the forward and reverse directions; and circuit means for receiving the recorded data from said head when the card is drawn in and feeding data to the head to be recorded when the card is expelled.

2. A magnetic card reader device according to claim 1, wherein said first tire is of a relatively softer material than the material of the second tire.

3. A magnetic card reader device according to claim 1, wherein said drive drum is generally cylindrical having a pair of axially spaced annular grooves in which said tires are reposed.

4. A magnetic card reader device according to claim 3, wherein said first and second tires are replaceable rings of a rubber-like material reposed in said annular grooves.

5. A magnetic card reader device according to claim 1 wherein said floating head support means includes a flat leaf spring having ends supported on said frame and supporting said head at a central position between said ends, with the leaf spring being oriented proximally-distally.

6. A magnetic card reader device according to claim 5 in which said floating head support means includes a pair of posts mounted on said frame proximally and distally of said head, respectively, and said leaf spring has proximal and distal openings at its ends which are placed over said posts.

7. A magnetic card reader device according to claim 6 wherein said proximal opening in the spring is elongated proximally-distally, to permit limited movement of the proximal end of said leaf spring with respect to the associated post.

8. A magnetic card reader device according to claim 5 in which said floating head support means includes first and second spacers disposed over said posts for spacing said leaf spring and said frame.

9. A magnetic card reader device according to claim 8 wherein said spacers are coil springs.

10. A magnetic card reader device according to claim 1 wherein said idler arm includes a pivot arm carrying said idler wheel at one end thereof, a pivot post mounting said pivot arm to said frame, and a spring yieldably urging the arm in the direction to bias the idler wheel towards the drive drum.

11. A magnetic card reader device according to claim 10 wherein said stop means of the idler arm includes an adjustable set screw mounted on one of said frame and said pivot arm, and contacting the other of the frame and pivot arm to hold the idler wheel out of contact with the second tire of the drive drum when there is no magnetic card present between the drive drum and the idler wheel.

12. A magnetic card reader device according to claim 5, in which said leaf spring central position includes a receptacle block having an opening into which the head is fitted.

13. A magnetic card reader device according to claim 12 in which said central position further includes a set screw in said receptacle block permitting vertical adjustment of said magnetic head relative to the associated drive tire.

14. A magnetic card reader device according to claim 5 wherein said leaf spring is beryllium copper.

* * * * *